United States Patent
Sabatino et al.

(10) Patent No.: US 7,260,926 B2
(45) Date of Patent: Aug. 28, 2007

(54) THERMAL MANAGEMENT SYSTEM FOR AN AIRCRAFT

(75) Inventors: Daniel Sabatino, East Hampton, CT (US); Louis J. Spadaccini, Manchester, CT (US); Scott Kaslusky, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/760,663

(22) Filed: Jan. 20, 2004

(65) Prior Publication Data

US 2005/0155353 A1  Jul. 21, 2005

(51) Int. Cl.
*F02K 7/224* (2006.01)
*F02K 7/22* (2006.01)
*F02K 7/236* (2006.01)

(52) U.S. Cl. .............. 60/206; 60/266; 60/267
(58) Field of Classification Search ............ 60/266, 60/267, 206
See application file for complete search history.

(56) References Cited

U.S. PATENT DOCUMENTS

| | | | |
|---|---|---|---|
| 3,948,626 A | 4/1976 | Bragg | |
| 4,020,632 A * | 5/1977 | Coffinberry et al. | 60/39.08 |
| 4,354,345 A | 10/1982 | Dreisbach, Jr. et al. | |
| 4,505,124 A | 3/1985 | Mayer | |
| 4,741,152 A | 5/1988 | Burr et al. | |
| 4,776,536 A | 10/1988 | Hudson et al. | |
| 4,879,052 A * | 11/1989 | Mullin | 508/440 |
| 5,511,374 A | 4/1996 | Glickstein et al. | |
| 6,182,435 B1 | 2/2001 | Niggemann et al. | |
| 6,282,881 B1 | 9/2001 | Beutin et al. | |
| 6,315,815 B1 * | 11/2001 | Spadaccini et al. | 95/46 |
| 6,415,595 B1 | 7/2002 | Wilmot, Jr. et al. | |
| 6,446,437 B1 * | 9/2002 | Smith | 60/734 |
| 6,604,558 B2 * | 8/2003 | Sauer | 95/96 |
| 2004/0194627 A1 * | 10/2004 | Huang et al. | 96/6 |

\* cited by examiner

*Primary Examiner*—Ted Kim
(74) *Attorney, Agent, or Firm*—Carlson, Gaskey & Olds

(57) ABSTRACT

A fuel based thermal management system includes a fuel stabilization system which permits the fuel to exceed the traditional coking temperatures. High temperature components are arranged along the fuel flow path such that even at the higher operating temperatures the fuel operates as a heat sink to transfer heat from high temperature components to the fuel. An optimal high temperature ester-based oil permits an oil-loop to exceed current oil temperature limits and achieve a high temperature to permit efficient rejection of heat to the fuel late in the fuel flow path.

22 Claims, 1 Drawing Sheet

THERMAL MANAGEMENT SYSTEM FOR AN AIRCRAFT

BACKGROUND OF THE INVENTION

The present invention relates to a thermal management system, and more particularly to a thermal management system which utilizes a fuel stabilization unit and isolates high temperature systems.

Modem aircraft utilize sophisticated Thermal Management Systems (TMS) for thermal management and cooling. In typical modes of operation of the aircraft, lubricating oil, hydraulic fluid, and accessory drives require cooling. At the same time, the avionic systems of the aircraft will require cooling during operation, some by a liquid coolant and others by air. Concurrently, it is generally desirable to heat the fuel delivered to the main propulsion engines to maximize the efficiency of the engine.

Typically, the fuel flow is utilized in combination with a fuel-oil heat exchanger. Although effective, the maximum operating temperature of aviation fuel is limited by a coking temperature limit. Coke deposits may result in a progressive degradation of engine performance.

To minimize this coking condition, the TMS often employs supplemental air-to-liquid heat exchangers that reject heat to either "ram air", engine fan bypass air flow, and/or "bleed air".

Ram air is air that is literally rammed into an inlet on the aircraft as a result of the aircraft's forward velocity. A penalty paid for the use of ram air includes system weight and aerodynamic drag. In addition, the installation of ram air circuits in an aircraft so as to convey the ram air to a point of use may be difficult. Moreover, in the case of aircraft intended for military use, ram air inlets may provide an undesirable aircraft radar return.

Fan bypass airflow is air drawn from the fan duct of a gas turbine engine. A penalty paid for the use of bypass airflow for thermal management is the reduction in operating efficiency of the engine.

Bleed air is air taken from the compressor section of the gas turbine engine, whether a main propulsion engine of the aircraft or an auxiliary power unit. A penalty paid for the use of bleed air is a reduction in operating efficiency of the engine from which the air is bled.

Accordingly, it is desirable to provide an effective, lightweight thermal management system which minimizes air-to-liquid heat exchangers.

SUMMARY OF THE INVENTION

The fuel based thermal management system according to the present invention includes a fuel stabilization system which permits the fuel to exceed the traditional coking temperatures. Air-to-liquid heat exchangers may be reduced and the heat generated by high temperature system components is rejected to the fuel which operates at a higher temperature due to the fuel stabilization system. High temperature components are arranged along the fuel flow path such that even at the higher operating temperatures the fuel operates as a heat sink to transfer heat from high temperature components to the fuel.

The present invention utilizes an optimal high temperature ester-based oil that permits an engine oil-loop which exceeds current oil temperature limits and achieves a high temperature which permits efficient rejection of heat to the fuel.

The present invention therefore provides an effective, lightweight thermal management system which minimizes air-to-liquid heat exchangers.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
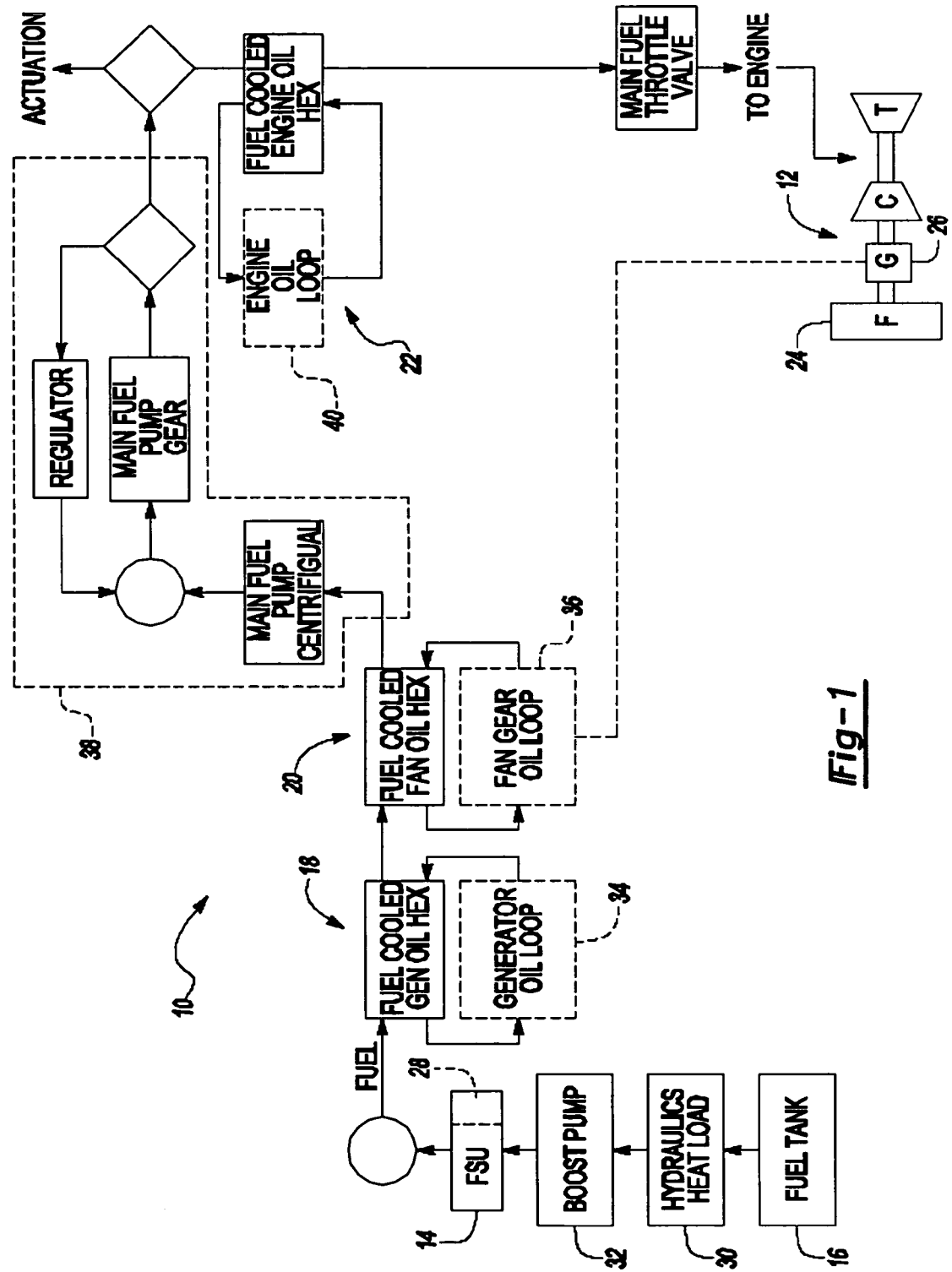
FIG. 1 is a general block diagram of an integrated thermal management system according to the present invention.

FIG. 1 illustrates a general perspective view of a fuel based thermal management system (TMS) 10 for an energy conversion device (ECD) 12. A fuel stabilization system (FSU) 14 receives a liquid fuel from a reservoir 16.

Typically, the fuel serves as a coolant for one or more (three shown) liquid-to-liquid heat exchanger sub-systems 18, 20, and 22. The fuel becomes progressively heated along the fuel flow path as the fuel draws thermal energy from components arranged along the fuel flow path. The heated fuel is then delivered to the fuel injectors for combustion within the ECD 12.

The ECD 12 may exist in a variety of forms in which the fuel, at some point prior to eventual use for processing, for combustion or for some form of energy release, acquires sufficient heat to support autoxidation reactions and coking if dissolved oxygen is present to any significant extent in the fuel. One form of the ECD 12 is a gas turbine engine, and particularly a geared turbofan engine which includes a turbofan 24 (illustrated schematically) which is speed reduced through a fan gear system 26 (illustrated schematically).

The fuel is typically a hydrocarbon such as a liquid jet fuel. The FSU 14 includes a deoxygenation system 28 which permits the fuel to remain stable at much higher temperatures without coking by removing dissolved oxygen from the liquid fuel which enables higher temperature loads to reject their heat to the fuel. It should be understood that various deoxygenation systems will benefit from the present invention.

From the reservoir 16 the fuel serves as a coolant for a hydraulics subsystem 30 as the fuel is communicated to the fuel stabilization system (FSU) 14 through a fuel boost pump 32. From the fuel boost pump 32 the fuel serves as a coolant for the first and second liquid-to-liquid heat exchanger sub-systems 18, 20. The first liquid-to-liquid heat exchanger sub-system 18 includes a generator oil loop 34. From the first liquid-to-liquid heat exchanger sub-system 18 fuel is communicated to the second liquid-to-liquid heat exchanger sub-system 20 that includes a fan gear oil loop 36 prior to the fuel being communicated to a main fuel pump 38.

The first and second liquid-to-liquid heat exchanger sub-systems 18, 20 preferably operate at conventional aircraft oil temperatures which are typically less than approximately 325 degrees Fahrenheit. That is, the components which are cooled by the generator oil loop 34 and the fan gear oil loop 36 are preferably operated below approximately 325 degrees Fahrenheit. Concurrently, the fuel flow prior to the main fuel pump 38 receives thermal energy from the oil loops 34, 36 and will thereby remain below approximately 325 degrees Fahrenheit. It is preferred that the fuel remain below approximately 325 degrees Fahrenheit prior to the main fuel pump 38 to minimize cavitations within the main fuel pump 38.

The temperature of the fuel increases as the fuel is communicated from the first liquid-to-liquid heat exchanger subsystem 18 to the second liquid-to-liquid heat exchanger sub-system 20. Preferably, the most temperature sensitive components are located furthest up stream of the ECD 12. That is, the fuel is lower in temperature the further the fuel is from the ECD 12. It should be understood, however, that should the main fuel pump 38 be capable of operating at fuel temperatures above approximately 325 degrees Fahrenheit, the fuel temperature may be permitted to exceed approximately 325 degrees Fahrenheit as the deoxygenated fuel from the FSU 14 will accept thermal energy in the range of 600 to 800 degrees Fahrenheit.

From the main fuel pump 38, the fuel serves as a coolant for the third liquid-to-liquid heat exchanger sub-systems 22. The third liquid-to-liquid heat exchanger sub-system 22 includes an engine oil loop 40. The components cooled by the engine oil loop 40 are the most resistant to temperature and are permitted to exceed approximately 325 degrees Fahrenheit. Preferably, the components cooled by the engine oil loop 40 utilize an optimized high temperature ester-based oil which operates at temperatures in excess of approximately 325 degrees Fahrenheit. Such an optimized high temperature ester-based oil is produced by NYCO S.A. Paris France under the trade name of GTO7. The optimized high temperature ester-based oil combined with the deoxygenated fuel temperature thermal retention capabilities permits associated components to operate above the conventional 325 degrees Fahrenheit temperature limit.

In combination with the deoxygenated fuel, the components cooled by the fuel flow are preferably separately distributed along the fuel flow path to advantageously utilize the increased temperature capabilities of the high temperature oil and higher temperature deoxygenated fuel. That is, although the fuel temperature is much higher after being utilized to previously cool the earlier oil loops 34, 36, the higher temperature fuel still operates as a heat sink for the still higher temperature engine oil loop 40 which includes components which are permitted to operate at the higher temperatures. Requirements for supplemental air-to-liquid heat exchangers are thereby minimized or eliminated.

The optimized high temperature ester-based oil are also preferably utilized with the first and second liquid-to-liquid heat exchanger sub-systems 18, 20 even though full advantage of the increased temperature capabilities may not be utilized. Moreover, separation of the oil loops in response to temperature capabilities permits components which may operate at higher temperatures to more fully utilize the capabilities of the high temperature oil and the deoxygenated fuel which, although at an elevated temperature later in the fuel flow path, operates as a heat sink to the still higher temperature components such as those in the engine oil loop 40.

It should be understood that the location of the FSU 14 represents only one of many possible locations, and that the FSU may alternatively be located between the first and second liquid-to-liquid heat exchanger sub-systems 18, 20 or downstream of the main fuel pump 38 while still deoxygenating the fuel to be advantageously utilized at higher temperatures with high temperature resistant components.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of thermal management within a vehicle having a gas turbine engine comprising the steps of:
    (1) deoxygenating a fuel onboard the vehicle to provide a deoxygenated fuel;
    (2) communicating the fuel through a first liquid-to-liquid heat exchanger system operable at a first maximum temperature;
    (3) communicating the deoxygenated fuel through a second liquid-to-liquid heat exchanger system operable at a second maximum temperature, said second maximum temperature greater than said first maximum temperature; communicating the deoxygenated fuel and an oil through the second liquid-to-liquid heat exchanger, the oil effective above approximately 325 degrees Fahrenheit and permitting the deoxygenated fuel to exceed 325 degrees Fahrenheit.

2. A method as recited in claim 1, wherein said step (2) farther comprises the step of:
    communicating the deoxygenated fuel and an oil through the first liquid-to-liquid heat exchanger, the oil effective above approximately 325 degrees Fahrenheit.

3. A method as recited in claim 1, wherein said step (2) further comprises the step of:
    communicating the deoxygenated fuel and an oil through the first liquid-to-liquid heat exchanger and preventing the oil from exceeding approximately 325 degrees Fahrenheit.

4. A method as recited in claim 3, further comprises the step of:
    communicating the oil through an oil loop in communication with a subsystem which can not exceed approximately 325 degrees Fahrenheit.

5. A method as recited in claim 1, wherein said step (1) occurs prior to said step (2).

6. A method as recited in claim 1, further comprises the step of:
    communicating the deoxygenated fuel through a fuel pump after said step (2).

7. A method as recited in claim 1, further comprises the step of:
    communicating the deoxygenated fuel from the first liquid-to-liquid heat exchanger to the second liquid-to-liquid heat exchanger.

8. A method as recited in claim 1 further comprising the step of:

(4) communicating the deoxygenated fuel to the gas turbine engine during operation of the gas turbine engine after said step (3).

9. A method of thermal management within an aircraft fuel system comprising the steps of:
   (1) communicating fuel from aircraft fuel tank;
   (2) deoxygenating the fuel on-board the aircraft to provide a deoxygenated fuel;
   (3) communicating the fuel through a first liquid-to-liquid heat exchanger system in communication with a first oil loop operable at a first maximum temperature;
   (4) communicating the deoxygenated fuel through a second liquid-to-liquid heat exchanger system in communication with a second oil loop operable at a second maximum temperature after said steps (2) and (3), said second maximum temperature greater than said first maximum temperature; communicating the deoxygenated fuel and an oil effective above approximately 325 degrees Fahrenheit in the second oil loop through the second liquid-to-liquid heat exchanger; and permitting the deoxygenated fuel to exceed a temperature of approximately 325 degrees Fahrenheit.

10. A method as recited in claim 9, wherein said step (3) further comprises the steps of:
    (a) communicating the deoxygenated fuel and an oil effective above approximately 325 degrees Fahrenheit in the first oil loop through the first liquid-to-liquid heat exchanger; and
    (b) communicating the oil within the first oil loop with a subsystem which can not exceed approximately 325 degrees Fahrenheit.

11. A method as recited in claim 10, wherein said step (b) further comprises the step of:
    (i) communicating the oil within the first oil loop with an aircraft generator subsystem.

12. A method as recited in claim 10, wherein said step (b) further comprises the step of:
    (i) communicating the oil within the first oil loop with an engine fan gear subsystem.

13. A method as recited in claim 10, wherein said step (a) further comprises the step of:
    (i) maintaining the deoxygenated fuel at a temperature below approximately 325 degrees Fahrenheit.

14. A method as recited in claim 9, further comprising the steps of:
    (5) maintaining the deoxygenated fuel at a temperature below approximately 325 degrees Fahrenheit prior to said step (4); and
    (6) communicating the deoxygenated fuel through a fuel pump prior to said step (4).

15. A method as recited in claim 9, wherein said step (4) further comprises the steps of:
    (a) communicating the deoxygenated fuel and an oil effective above approximately 325 degrees Fahrenheit in the second oil loop through the second liquid-to-liquid heat exchanger; and
    (b) communicating the oil within the second oil loop with an aircraft subsystem which operates in excess of approximately 325 degrees Fahrenheit.

16. A method as recited in claim 15, wherein said step (b) further comprises the step of:
    (ii) communicating the oil within the second oil loop with an engine oil loop.

17. A method as recited in claim 15, further comprising the steps of:
    (c) communicating the deoxygenated fuel through a fuel pump prior to said steps (a) and (b).

18. A method as recited in claim 9, further comprising the step of:
    (5) communicating the deoxygenated fuel to the gas turbine engine during operation of the gas turbine engine after said step (4).

19. A method of thermal management within an aircraft fuel system comprising the steps of:
    (1) deoxygenating the fuel on-board the aircraft to provide a deoxygenated fuel;
    (2) communicating the fuel through a first liquid-to-liquid heat exchanger system in communication with a first oil loop operable at a temperature below approximately 325 degrees Fahrenheit; and
    (3) communicating the deoxygenated fuel through a second liquid-to-liquid heat exchanger system in communication with a second oil loop operable at a temperature above approximately 325 degrees Fahrenheit after said steps (1) and (2) and permitting the deoxygenated fuel to exceed a temperature of approximately 325 degrees Fahrenheit.

20. A method as recited in claim 19, wherein said step (1) occurs prior to said step (2) such that deoxygenated fuel is communicated through the first liquid-to-liquid heat exchanger system.

21. A method as recited in claim 19 further comprising the step of:
    (5) communicating the deoxygenated fuel to the gas turbine engine during operation of the gas turbine engine after said step (3).

22. A method as recited in claim 19, further comprising the steps of:
    (4) communicating the deoxygenated fuel through a fuel pump prior to said step (3).

* * * * *

UNITED STATES PATENT AND TRADEMARK OFFICE
CERTIFICATE OF CORRECTION

| | |
|---|---|
| PATENT NO. | : 7,260,926 B2 |
| APPLICATION NO. | : 10/760663 |
| DATED | : August 28, 2007 |
| INVENTOR(S) | : Sabatino et al. |

Page 1 of 1

It is certified that error appears in the above-identified patent and that said Letters Patent is hereby corrected as shown below:

Claim 2, Column 4, line 40: "farther" should read as --further--

Claim 9, Column 5, line 6: insert --on-- after "from" and before "aircraft"

Signed and Sealed this

Fourth Day of December, 2007

JON W. DUDAS
*Director of the United States Patent and Trademark Office*